US010769386B2

(12) United States Patent
Vasiltschenko et al.

(10) Patent No.: US 10,769,386 B2
(45) Date of Patent: Sep. 8, 2020

(54) TERMINOLOGY PROPOSAL ENGINE FOR DETERMINING TARGET LANGUAGE EQUIVALENTS

(71) Applicant: SAP SE, Walldorf (DE)

(72) Inventors: Michail Vasiltschenko, Schriesheim (DE); Benjamin Schork, Wilhelmsfeld (DE); Mark Childress, Walldorf (DE); Annika Berger, Walldorf (DE); Yvonne Miklosch, Nussloch (DE); Thomas Alcantara Kliche, Wiesloch (DE); Hanne Smaadahl, Victoria (CA); Ying Zou, Walldorf (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 15/831,395

(22) Filed: Dec. 5, 2017

(65) Prior Publication Data
US 2019/0171719 A1    Jun. 6, 2019

(51) Int. Cl.
| G06F 40/44 | (2020.01) |
| G06F 16/338 | (2019.01) |
| G06F 16/33 | (2019.01) |
| G06F 40/20 | (2020.01) |
| G06F 40/131 | (2020.01) |
| G06F 40/157 | (2020.01) |
| G06F 40/242 | (2020.01) |
| G06F 40/247 | (2020.01) |
| G06F 40/263 | (2020.01) |
| G06F 40/40 | (2020.01) |
| G06F 40/58 | (2020.01) |

(Continued)

(52) U.S. Cl.
CPC ............ *G06F 40/44* (2020.01); *G06F 16/338* (2019.01); *G06F 16/3337* (2019.01); *G06F 40/131* (2020.01); *G06F 40/157* (2020.01); *G06F 40/20* (2020.01); *G06F 40/242* (2020.01); *G06F 40/247* (2020.01); *G06F 40/263* (2020.01); *G06F 40/40* (2020.01); *G06F 40/47* (2020.01); *G06F 40/51* (2020.01); *G06F 40/58* (2020.01)

(58) Field of Classification Search
CPC ............... G06F 17/2818; G06F 17/289; G06F 17/2836; G06F 17/2854; G06F 17/2872; G06F 16/333; G06F 40/58; G06F 40/51; G06F 40/47; G06F 40/40; G06F 40/44
See application file for complete search history.

(56) References Cited

U.S. PATENT DOCUMENTS 4,860,206 A  *  8/1989  Kugimiya ........... G06F 17/2872
                                                    704/6
5,687,383 A  *  11/1997  Nakayama .......... G06F 17/2827
                                                    704/2
(Continued)

*Primary Examiner* — Samuel G Neway
(74) *Attorney, Agent, or Firm* — Fish & Richardson P.C.

(57) ABSTRACT

An input terminology is received in a source language to determine a target language proposal. In a proposal engine when a configuration profile is available the following steps are performed. A set of target language equivalents are determined by applying a user-defined set of approaches to the input terminology. Statistics is computed corresponding to the set of target language equivalents. A target language proposal from the set of target language equivalents is determined based on the computed statistics. The target language proposal along with the computed statistics is displayed in a graphical user interface.

20 Claims, 8 Drawing Sheets

(51) Int. Cl.
*G06F 40/47* (2020.01)
*G06F 40/51* (2020.01)

(56) References Cited

U.S. PATENT DOCUMENTS

| | | | |
|---|---|---|---|
| 5,826,220 A * | 10/1998 | Takeda | G06F 17/2755 704/7 |
| 6,559,861 B1 * | 5/2003 | Kennelly | G06F 9/454 715/703 |
| 6,885,985 B2 | 4/2005 | Hull | |
| 8,326,598 B1 * | 12/2012 | Macherey | G06F 17/289 704/4 |
| 8,548,791 B2 | 10/2013 | Itagaki et al. | |
| 8,645,289 B2 | 2/2014 | Bennett et al. | |
| 8,725,760 B2 | 5/2014 | Heidasch | |
| 9,311,296 B2 | 4/2016 | Heidasch et al. | |
| 9,519,643 B1 * | 12/2016 | Nakagiri | G06F 17/2223 |
| 9,558,182 B1 | 1/2017 | Chenon et al. | |
| 9,760,569 B2 * | 9/2017 | Shin | G06F 17/2785 |
| 2003/0046056 A1 * | 3/2003 | Godoy | G06F 17/289 704/1 |
| 2006/0206304 A1 * | 9/2006 | Liu | G06F 17/2836 704/2 |
| 2008/0306728 A1 * | 12/2008 | Kamatani | G06F 17/2818 704/7 |
| 2012/0265518 A1 * | 10/2012 | Lauder | G06F 17/2854 704/3 |
| 2012/0316862 A1 | 12/2012 | Sultan et al. | |
| 2013/0035927 A1 * | 2/2013 | Cha | G06F 17/289 704/3 |
| 2013/0197898 A1 * | 8/2013 | Choi | G06F 17/28 704/3 |
| 2013/0226553 A1 * | 8/2013 | Ji | G06F 17/2818 704/2 |
| 2014/0200878 A1 * | 7/2014 | Mylonakis | G06F 17/2818 704/4 |
| 2015/0081273 A1 * | 3/2015 | Sonoo | G06F 17/2818 704/2 |
| 2015/0161113 A1 * | 6/2015 | Chin | G06F 17/289 704/2 |
| 2015/0293908 A1 * | 10/2015 | Mathur | G06F 17/2818 704/2 |
| 2017/0075883 A1 * | 3/2017 | Kamatani | G06F 17/2836 |
| 2017/0220562 A1 * | 8/2017 | Yamauchi | G06F 17/2827 |
| 2017/0270104 A1 * | 9/2017 | Alshikh | G06F 17/2854 |
| 2017/0371868 A1 * | 12/2017 | Zhang | G06F 17/2854 |
| 2019/0108222 A1 * | 4/2019 | Anglin | G06F 17/289 |
| 2019/0171719 A1 * | 6/2019 | Vasiltschenko | G06F 17/2818 |

\* cited by examiner

CONFIGURATION UI FOR TERM PROPOSALS

PROFILE  1 ▼ 205

REFERENCE LANGUAGE:  GERMAN ▼ 210

LANGUAGE WEIGHT:
ENGLISH     100 ▼
GERMAN      100 ▼
ITALIAN     100 ▼
NORWEGIAN   200 ▼
ADD LANGUAGE
— 215

SOURCE
REPOSITORY A   100 ▼
REPOSITORY B   100 ▼
REPOSITORY K   100 ▼
ADD SOURCE
— 220

CUSTOMER DEFINED METADATA
DOMAIN      FINANCIALS ▼
USER        USERID ▼
TIMEFRAME   01.01.2011 – 01.01.2012 ▼
ADD METADATA
— 225

FIG. 2

TERMINOLOGY PROPOSAL ENGINE FOR DETERMINING TARGET LANGUAGE EQUIVALENTS

FIELD

Illustrated embodiments generally relate to advanced technical translation, and more particularly terminology proposal engine for target language equivalents.

BACKGROUND

Enterprise products having a global market are designed and developed to be multi-lingual to support customers across the globe. Some languages are widely spoken and technical terminologies are readily available in those languages, while some languages are evolving with time and technical terminologies are not readily available. Typically, enterprises hire native speakers to manually translate a source technical term to a target technical term. In some cases, existing language translators are used to translate to a desired target language. Most of the existing language translators use English language as an intermediate language to translate from a source language to destination language, and this technique has limitations in terms of accuracy of translation. Manual translation depends on the skill of translator and is time consuming, whereas, the existing language translators are limited in capability. Translating technical content with accuracy and efficiency is challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2 is a block diagram illustrating exemplary configuration user interface in terminology proposal engine for determining target language equivalents, according to one embodiment.

FIG. SA is a flow diagram illustrating an exemplary use case of terminology proposal engine for determining target language equivalents, according to one embodiment.

FIG. SB shows tables with computed target language equivalents, according to one embodiment.

Figure 6:
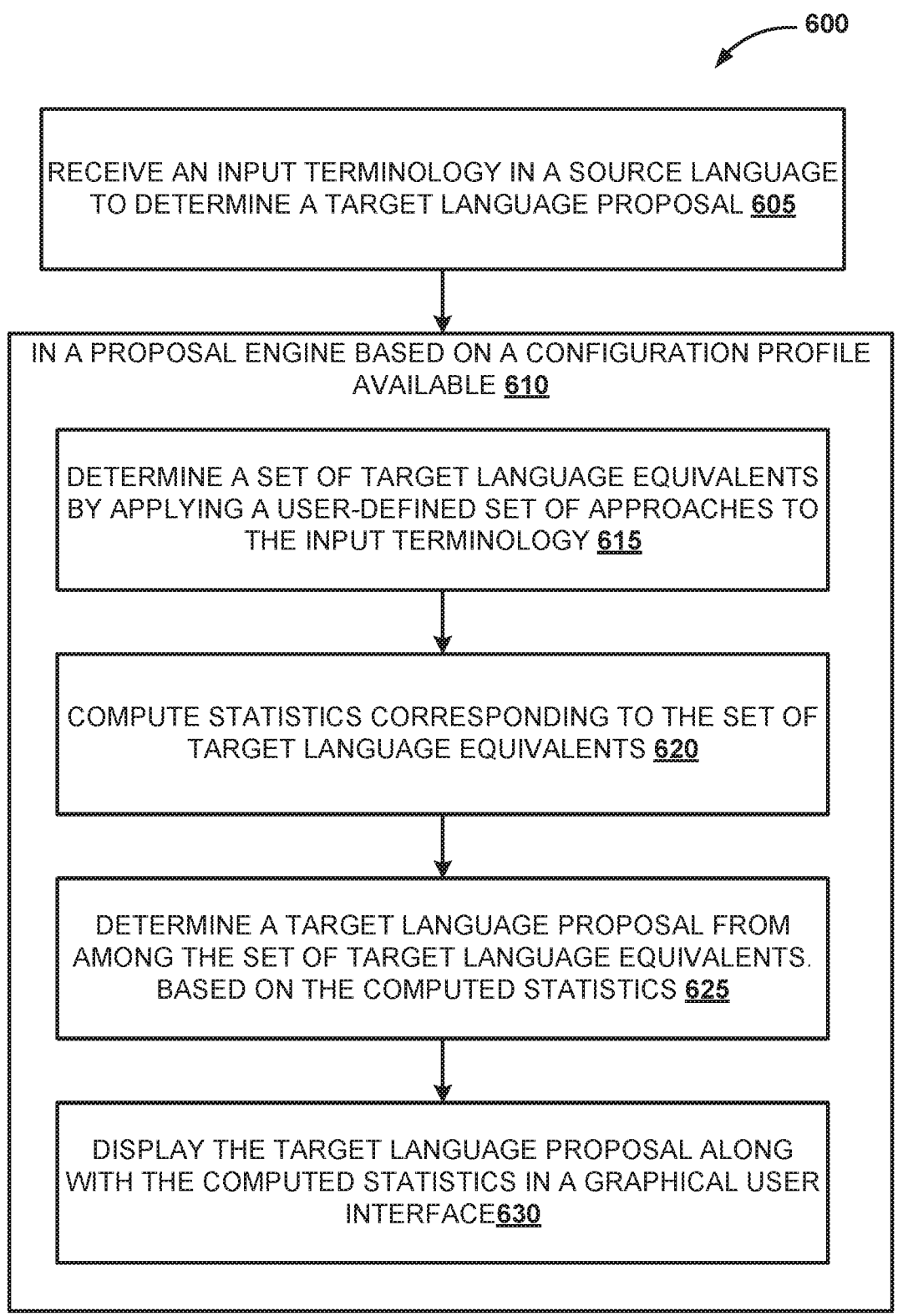

FIG. 6 is a flow chart illustrating process of terminology proposal engine for determining target language equivalents, according to one embodiment.

Figure 7:
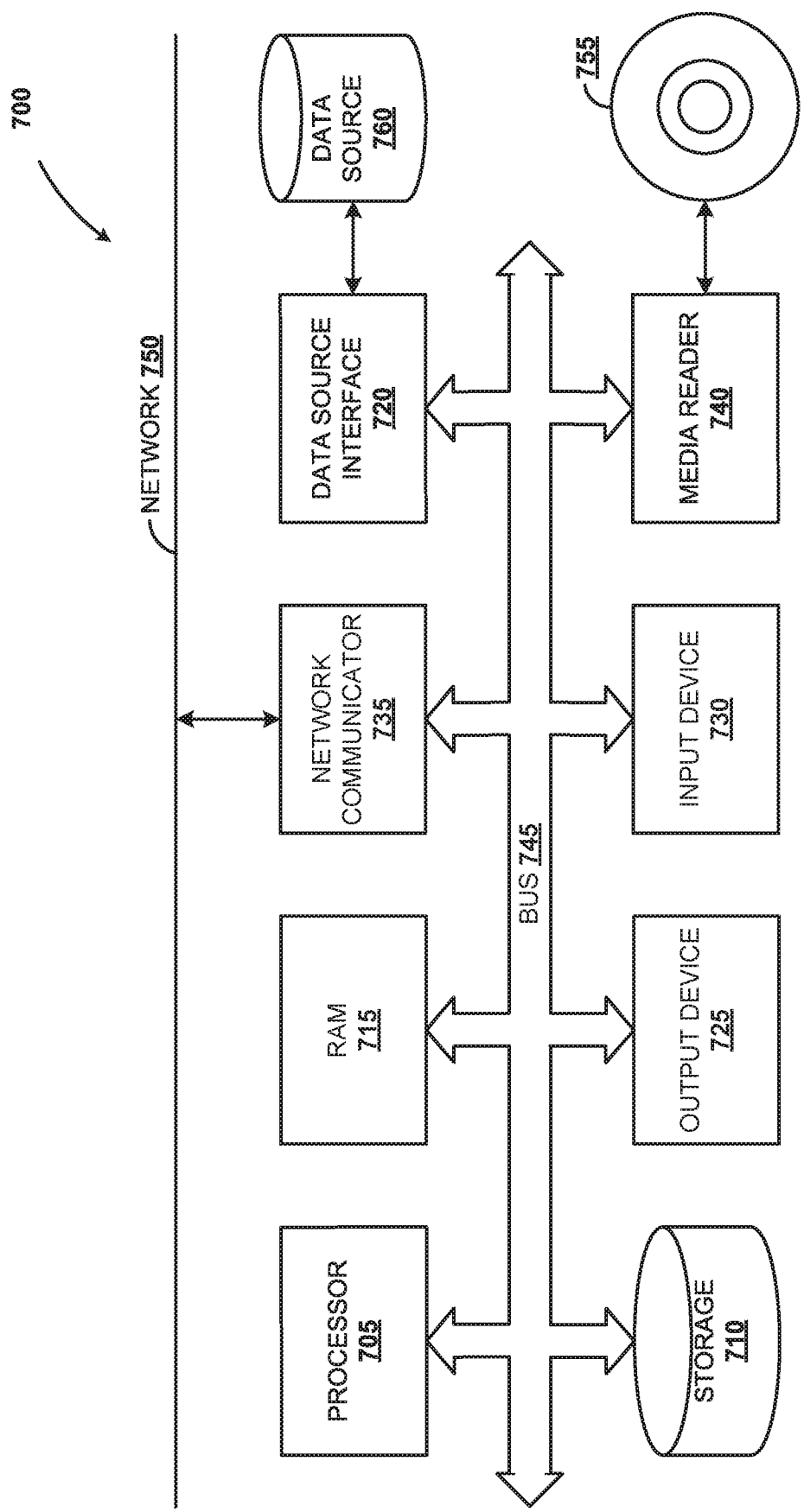

FIG. 7 is a block diagram of an exemplary computer system, according to one embodiment.

DETAILED DESCRIPTION

Embodiments of techniques of terminology proposal engine for determining target language equivalents are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
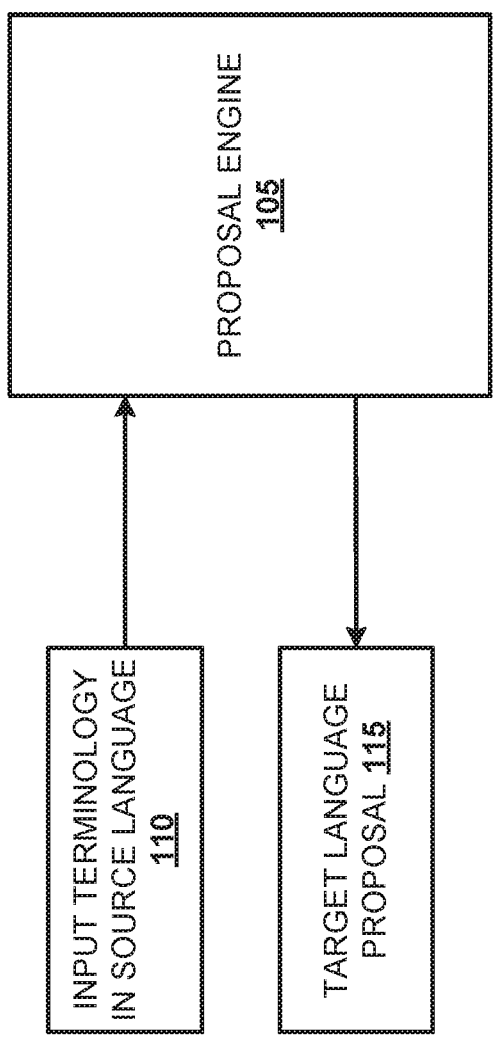
FIG. 1 is a block diagram illustrating high-level architecture of terminology proposal engine for determining target language equivalents, according to one embodiment.

FIG. 1 is a block diagram illustrating high-level architecture of terminology proposal engine for determining target language equivalents, according to one embodiment. Global enterprises offer products to customers that support more than 40 languages. The products and associated user interfaces, documentation, operating/installing instructions, training materials, web pages, contracts, brochures, and other marketing information are expected to support the over 40 languages. Terminology standards are defined based on international norms to enforce standard definitions across languages. A terminology is provided as input in a source language. Proposal engine 105 receives an input terminology in the source language 110 for processing, and determines a target language equivalent corresponding to the input terminology. The input terminology is received through a create terminology UI (not shown) which is a graphical user interface. The input terminology may be provided in various forms such as direct input of the source terminology for example, by entering the terminology 'company code' via typing or copying and pasting or via auto complete feature. The input terminology may also be provided by uploading a document where a list of potential source language terminologies is recognized and the list of potential source language terminologies are provided to the proposal engine 105. The terminology candidates are terms that have a certain salience within the document. Industry benchmarks indicate that about 4-6% of all words in a text are potential term candidates, and of these an average of 1-2% would qualify as terms. For example, in a document of 1000 words, the number of term candidates may be as high as 60 or as low as 1. A term or terminology may contain one or more words, for example, 'company', 'company code'. 'key performance indicator', etc. The proposal engine 105 not only takes the source language or a reference language into account to find the best proposal for the target language equivalent, but also takes the available existing languages into account to verify the proposal in a multi-channel approach. The proposal engine 105 may include complex logic to determine a corresponding target language equivalent for the received input terminology in the source language 110. The determined target language proposal 115 is provided in a graphical user interface to a terminologist or subject matter expert to review and approve/reject.

FIG. 2 is a block diagram illustrating an exemplary configuration user interface (UI) in terminology proposal engine for determining target language equivalents, according to one embodiment. User or administrator or customer may configure various configuration profiles depending on their requirement of translation, and provide these configuration profiles as input to the proposal engine for identifying target language equivalents. A configuration profile with identifier '1' 205 is created in a configuration UI. Various configuration parameters may be defined in the configuration UI such as reference language, language weight, source, customer defined metadata, etc. Reference language may be selected from the drop down, for example, 'German' as shown in 210. Language weight may be configured for user selected languages along with weights. For example, as shown in 215, language 'English' is added with a weight of '100', language 'German' is added with a weight of '100', language 'Italian' is added with a weight of '100', and language 'Norwegian' is added with a weight of '200'. Source of language repositories along with weights may be configured as shown in 220. For example, source 'repository A' with weight '100', 'repository B' with weight 100 and 'repository K' with weight 100 may be configured.

Customer defined metadata may include other parameters to be included or excluded for the term proposal process. Some of the parameters are domain that indicates the subject area such as medical, financials, manufacturing, supply chain, sports, political, construction, urban, reference treatise, etc. Values configured for the domain indicates that a selected subject area is preferred while determining target language equivalents. For example, as shown in 225, customer defined metadata such as domain with custom options, such as 'financials', user with options such as 'user ID', and timeframe within which target language equivalents are to be considered, for example, time frame range '01.01.2011' to '01.01.2012', is configured to determine target language equivalent within this time frame and not from historic data. The configuration profile is saved in a configuration and statistical database with the received configuration parameters. The configuration profiles are configured as shown above, and the configuration profiles are provided as input to the proposal engine to determine the target language equivalent.

Figure 3:
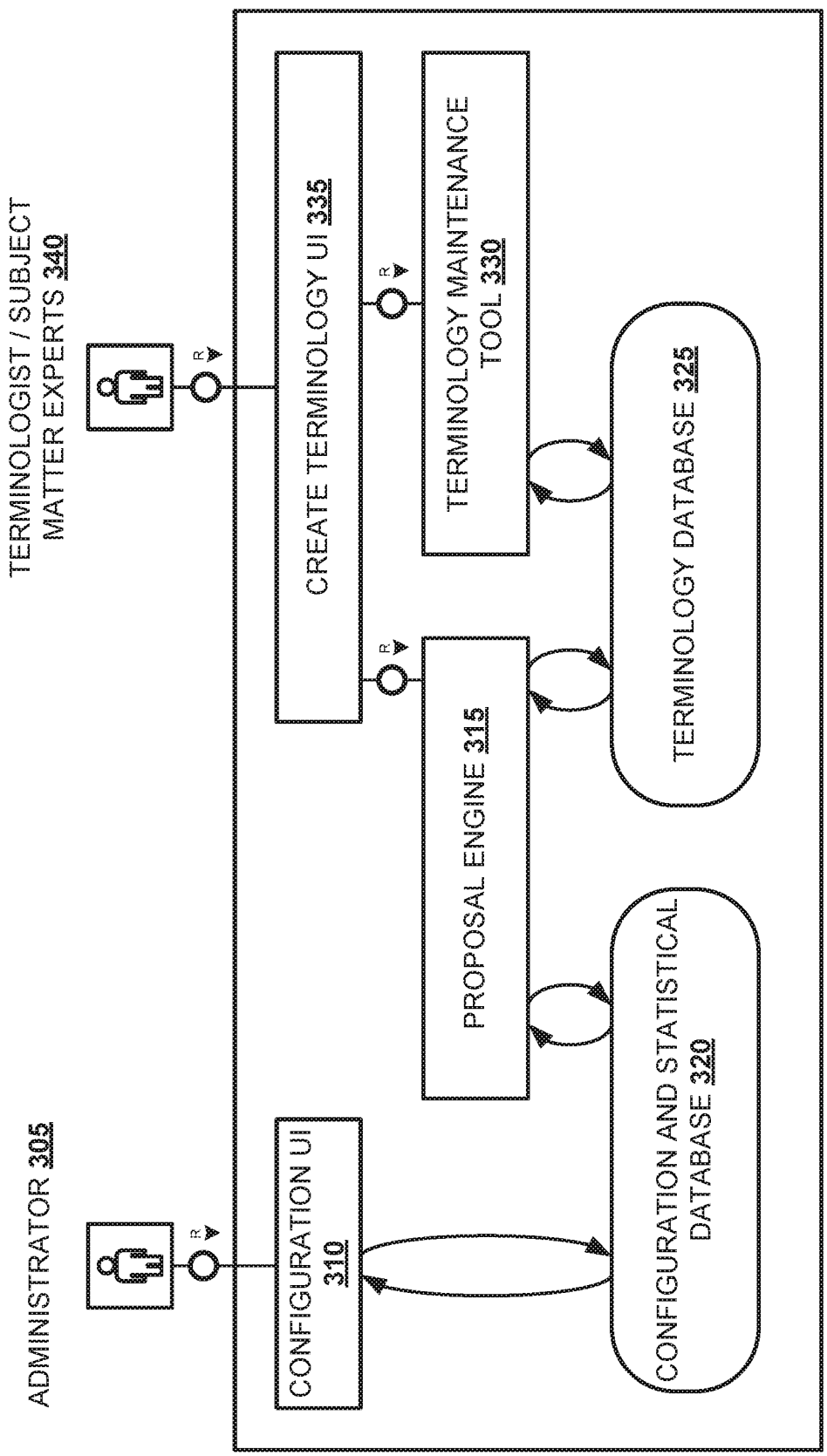
FIG. 3 is a block diagram illustrating architecture of terminology proposal engine for determining target language equivalents, according to one embodiment.

FIG. 3 is a block diagram illustrating architecture of terminology proposal engine for determining target language equivalents, according to one embodiment. Administrator 305 can configure various configuration profiles in configuration UI 310 depending on the target language requested, and provide these configuration profiles as input to proposal engine 315 for identifying target language equivalents. Configuration profiles are configured through configuration UI 310 as explained in FIG. 2. Configuration UI 310 provides a graphical user interface to configure various parameters associated with the configuration profile. The configured profiles are stored in configuration and statistical database 320. The proposal engine 315 retrieves the configuration profiles from the configuration and statistical database 320 while determining target language equivalents. The proposal engine 315 may be integrated with various types of terminology database and various types of existing terminology maintenance tools. Terminology database 325 also referred to as term database is a repository where standardized technical and non-technical terms are created, maintained and searched. Terminology maintenance tool 330 is an application using which terminology database 325 is created and maintained. Create terminology UI 335 is a graphical user interface where terminology experts/subject matter experts 340 provide an input terminology in a source language and request a target language equivalent.

When the input terminology is provided in the source language, through the create terminology UI 335, the proposal engine 315 determines a set of target language equivalents based on a set of approaches. The set of approaches may be pre-defined when the configuration profile is not defined, and the set of approaches may be user-defined when the configuration profile is defined. Based on the configuration profile selected, statistics are computed for the individual target language equivalents, and a target language proposal is determined from the set of target language equivalents. The example below illustrates the user-defined set of approaches based on the selected configuration profile. For the input terminology provided in the source language, the first approach is to 'use English source term as is'. For example, an input terminology is provided in source language English, and using the first proposal a target language equivalent in 'Spanish for Columbia' is identified. The input terminology 'simultaneous engineering' and 'concurrent engineering' are provided as input. In the first approach, English source term is used as is, and accordingly 'simultaneous engineering' and 'concurrent engineering' are proposed as equivalent choice in target language. For the input terminology provided in the source language, the second approach is to 'use calque', e.g., a literal word-for-word or root-to-root translation of a word or phrase from another language. For example, the input terminology 'simultaneous engineering' and 'concurrent engineering' are provided in English, and using the second proposal a target language equivalent in 'Spanish for Columbia' is identified. In the second approach, 'use calque' is applied on the English term 'simultaneous engineering' and the translation 'ingeniería simultánea' is identified as equivalent choice in the target language.

When the input terminology is provided in the source language, the third approach is to 'use English language or any reference language' as intermediate reference language before translating to a target language. For example, the input terminology i.e., 'simultaneous engineering' and 'concurrent engineering' in English language is translated to an intermediate language 'ingeniería simultánea' in Spanish, and the intermediate Spanish translation is subsequently translated to the target language 'ingeniería simultánea' in 'Spanish for Columbia'. When the input terminology is provided in a source language, a fourth approach is to 'use multi-lingual term data to verify the translation in a multi-channel approach'. For example, an input terminology is provided in English and the using the fourth proposal a target language term in 'Spanish for Columbia' identified. For the input terminology i.e., 'simultaneous engineering' and 'concurrent engineering' in English language, over 90% of the target language terms such as Italian, French. Romanian, etc., are translated to 'ingenierí' and 'simultánea', and therefore the target language proposal 'ingeniería simultáneai' is provided as proposal.

When the input terminology is provided in the source language, through the create terminology UI 335, the proposal engine 315 determines the target language equivalent based on the set of approaches explained above. In one embodiment, the set of approaches can vary based on the configuration profile selected by administrator. Based on the configuration profile chosen, corresponding set of approaches are used to determine the target language equivalent for the given input terminology in the source language. In one embodiment, the create terminology UI 335 may be used to create a terminology along with a definition in a specific language. The created terminology UI 335 may be used to determine the target language equivalent. The terminology can also be created by automatically uploading the terminology via Term Base eXchange (TBX). TBX is an international standard for the representation of structured concept-oriented terminological data. TBX defines an XML format for the exchange of terminologies between various tools/applications. Using the TBX standard, the terminologies can be automatically uploaded from various applications to the terminology database 325.

Figure 4:
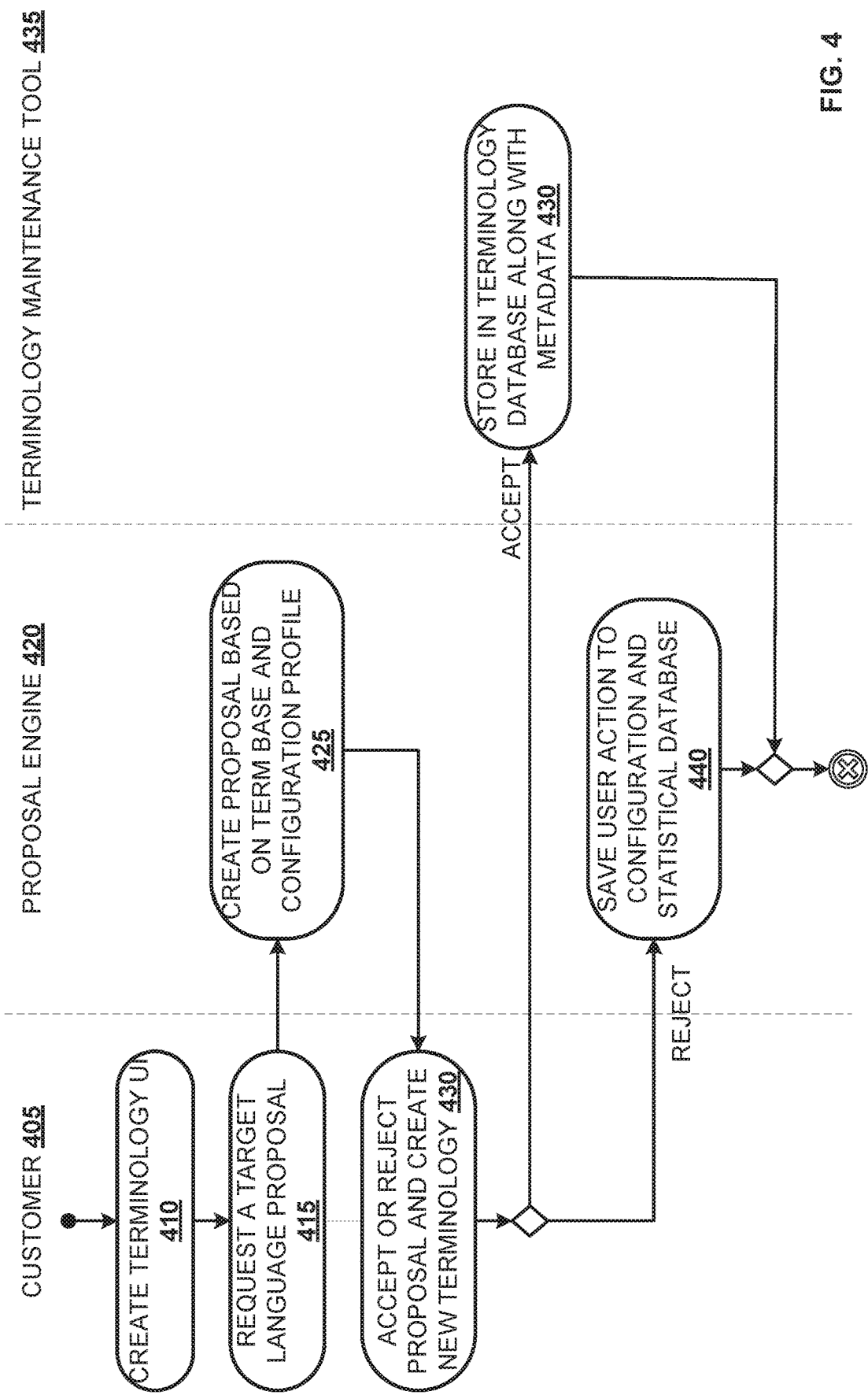
FIG. 4 is a sequence diagram illustrating sequence of flow in a terminology proposal engine for determining target language equivalents, according to one embodiment.

FIG. 4 is a sequence diagram illustrating sequence of flow in a terminology proposal engine for determining target language equivalents, according to one embodiment. Customer 405 invokes create terminology UI 410, and provides an input terminology in a source language, and requests a target language proposal 415. The request for target language proposal 415 is received at proposal engine 420. The proposal engine 420 determines the target language proposal corresponding to the input terminology provided in the source language. The proposal engine creates the target language proposal based on a configuration profile selected by the customer, and the terminology database. The proposal engine may refer to the terminology database while creating the proposal 425. The target language proposal is provided by the proposal engine 420 to the customer 405. The customer may choose to accept or reject the proposal 430. If the customer chooses to accept the proposal, the target language proposal is stored in the terminology database with metadata for future reference. For example, an input terminology is provided in 'German' and a target language term in 'Russian' is determined. The source language i.e., 'Vorhersagemethode' in 'German' language is translated to the target language equivalent 'прогнозный метод' in 'Russian'. The translation 'прогнозный метод' is provided as target language proposal to the customer. If the customer accepts the proposal, 'прогнозный метод' is stored in the terminology database along with metadata 430 indicating the 'German' input terminology corresponding to this translation. Terminology maintenance tool 435 may be used to store the translation in the terminology database. If the customer rejects the target language proposal, the user action of rejection is saved/recorded in a configuration and statistical database 440. For example, an input terminology is provided in 'English' and a target language term in 'French' is determined. The source language i.e., 'cloud computing' in 'English' language is translated to the target language equivalent 'informatique' in 'French'. The translation 'Informatique' is provided as target language proposal to the customer. If the customer rejects the proposal, the rejection action performed for the input terminology is stored in the configuration and statistical database along with metadata indicating the 'English' input terminology corresponding to this translation. When a subsequent request comes from a different customer for the input terminology 'cloud computing' in 'English' language to be translated to the target language equivalent in 'French', the proposal 'Informatique' is never provided to the customer because it was the rejected proposal. For the specific customer or user, action corresponding to the displayed target language proposal is used to recognize a pattern, and based on the recognized pattern, the configuration profile is implicitly modified. For example, if the user rejects the target language proposal provided from using calque, this pattern may be used to implicitly modify the weight associated with calque approach, so that calque approach is not giving higher weight or priority.

Figure 5A:
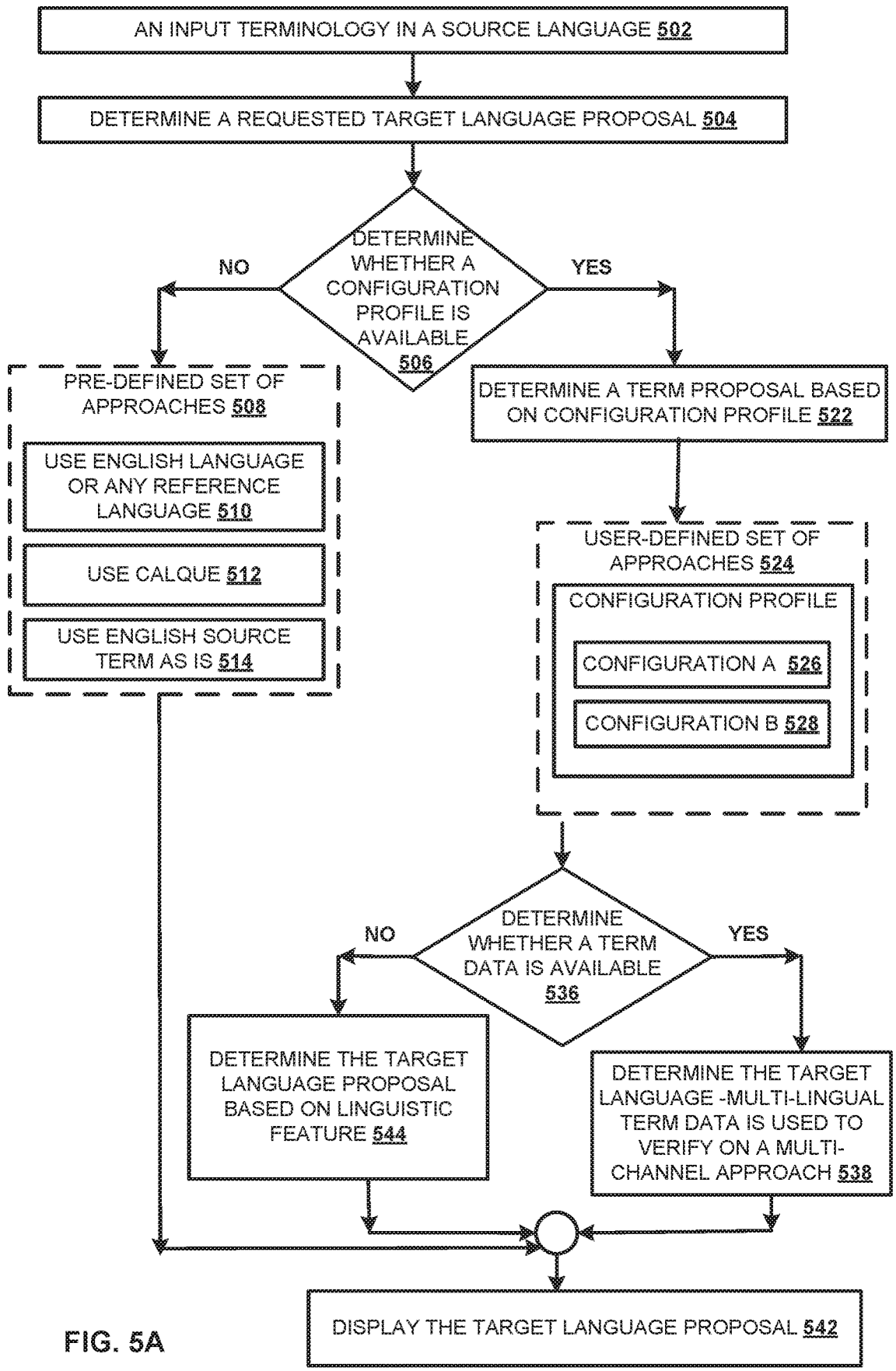

FIG. 5A is a flow diagram illustrating an exemplary use case of terminology proposal engine for determining target language equivalents, according to one embodiment. A terminologist provides an input terminology in a source language 502 to determine a target language equivalent. For example, the terminologist would like to determine the target language equivalent i.e., 'Italian for Switzerland' for the input terminology 'company code' in the source language, e.g., 'English' language. When the input terminology in the source language is received, at 504, the requested target language proposal is determined. At 506, it is determined whether a configuration profile is available for the requested target language proposal. Upon determining that the configuration profile is not available, at 508, a predefined set of approaches are executed in parallel for the received input terminology to determine a corresponding set of target language equivalents. For example, for the input terminology 'company code' in the source language 'English', the pre-defined set of approaches, 'use English language or any reference language' 510, 'use calque' 512, and 'use English source term as is' 514, are used to determine the set of target language equivalents.

Figure 5B:
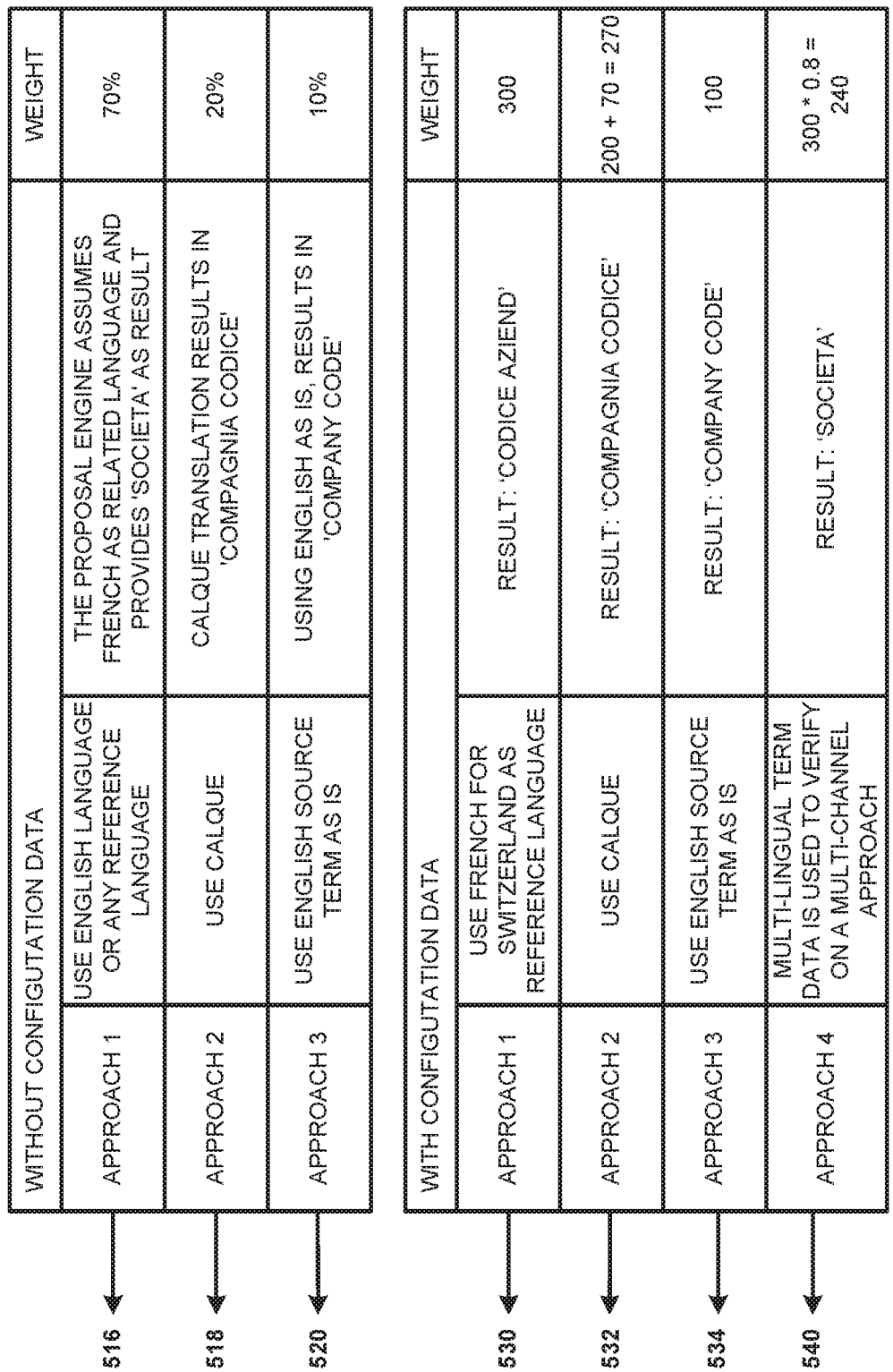

The individual approaches in the pre-defined set of approaches have a corresponding weight associated with them. Based on the weight, statistics are computed for the individual approaches. For example, 'use English language or any reference language' 510 may have a weight of 70%, 'use calque' 512 may have a weight of 20%, and 'use English source term as is' 514 may have a weight of 10%. The proposal engine learns user behavior and implicitly modifies the weights associated with the individual approaches. Based on the user behavior and preference of acceptance/rejection of target language proposals, weights of certain approaches are increased over the others. For the input terminology 'company code' in the source language 'English', the pre-defined set of approaches, 'use English language or any reference language' 510, 'use calque' 512, and 'use English source term as is' 514, are used to determine the target language equivalents in 'Italian for Switzerland'. For the input terminology 'company code', when the approach 'use English language or any reference language' 510 is applied, the proposal engine assumes 'French' as related language and provides 'societa' as result as shown in 516 in FIG. 5B. FIG. 5B shows tables with computed target language equivalents. The proposal engine automatically identifies a language that is similar to the target language, and in this case, 'French' is identified as the similar language to 'Italian for Switzerland'. A language is identified to be similar to another language if there is significant lexical and structural overlap. When the proposal 'use calque' 512 is applied on the input terminology 'company code', this results in a target language equivalent 'compagnia codice' as shown in 518 in FIG. 5B. When the proposal 'use English source term as is' 514 is applied on the input terminology 'company code', it results in a target language equivalent 'company code' as shown in 520 in FIG. 5B. The pre-defined set of approaches have provided results, and based on the weight associated with the individual approaches, a final target language proposal is determined. Accordingly, the approach 'use English language or any reference language' 510 having a weight of 70% is identified as the target language equivalent, and the result generated by this proposal 'società' is determined as the target language proposal.

Upon determining that the configuration profile is available, at 522, a term data is determined based on the configuration profile. The configuration profile includes a user-defined set of approaches 524 such as 'configuration A' 526 and 'configuration B' 528. The 'configuration A' 526 and 'configuration B' 528 may define various parameters associated with the configuration profile, and various user-defined approaches. The user-defined approach 'use French for Switzerland' as reference language has a configured weight of 300. For example, for the input terminology 'company code' in the source language 'English', the approach 'use French for Switzerland' as reference language, results in a target language equivalent 'codice aziend'. The target language equivalent 'codice aziend' is associated with a weight of 300 as shown in 530 in FIG. 5B. The approach 'use calque' has a configured weight of 200, and additional metadata such as source 'domain A' has an assigned weight of 70. When the approach 'use calque' is applied to the input terminology, it results in a target language equivalent 'compagnia codice' as shown in 532 in FIG. 5B. The target language equivalent 'compagnia codice' is associated with a weight of 270. The user-defined approach 'use English source term as is' has a configured weight of 100. For example, for the input terminology 'company code' in the source language 'English', the approach 'use English source term as is', results in proposal 'company code'. The proposal 'company code' is associated with a weight of 100 as shown in 534. At 536, it is determined whether a term data is available for the requested target language proposal. For example, the term data is identified using the three user-defined approaches explained above such as 'codice aziend', 'compagnia codice' and 'company code'. Upon determining that the term data is available, at 538, multi-lingual term data is used to verify on a multi-channel approach. The proposal engine takes the possible translated variants into account to verify on the multi-channel approach. For the term data 'codice aziend', 'compagnia codice' and 'company code', 80% of the target language terms such as Italian, French, Latin, Romanian, etc., are translated to 'società'. The approach 'multi-lingual term data is used to verify on a multi-channel approach' has a configured weight of 300, and since 80% of target language terms are translated to 'societa', the result weight is 300*0.8=240. The target language equivalent 'società' is associated with a weight of 240 as shown in 540 in FIG. 5B.

Based on the configuration profile, weights of the individual approaches are calculated as explained above. Let the sum of all the approaches, or the maximum score be 1000. The user-defined approach 'use French for Switzerland' as reference language, results in 'codice aziend' with an associated weight of 300, and this results in a percentage of 300/1000*100=30%. The user-defined proposal 'use calque', results in 'compagnia codice' with an associated weight of 270, and this results in a percentage of 270/1000*100=27%. The user-defined proposal 'use English term as is', results in proposal 'company code' with an associated weight of 100, and this results in a percentage of 100/1000*100=10%. The proposal 'multi-lingual term data is used to verify on a multi-channel approach', results in 'società' with an associated weight is 300*0.8=240, and this results in 240s1000*100=24%. Based on the statistics computed above, the target language equivalent 'codice aziend' is determined as a proposed target language equivalent since it has the highest weight/percentage 30%. The target language proposal 'codice aziend' is provided to the user, and the user may choose to accept or reject the proposal. There is 100%−30%−24%−27%−100%=19% chance for the user to change the proposal. At 542, the target language proposal 'codice aziend' along with the computed statistics i.e., weight 30% is displayed in a graphical user interface associated with a create terminology user interface.

Upon determining that the term data is not available, at 544, based on linguistic feature, a target language proposal is determined. Linguistic features include various types of parameters associated with various aspects. For example, term variant type such as preferred term, forbidden term, abbreviation, synonyms, etc., grammatical aspects such as noun, verb, etc., term length, number of words, etc. The individual linguistic feature may be associated with a weight, and the target language proposal is calculated based on the weight associated with the individual linguistic feature. At 542, the target language proposals along with the percentage of individual proposal is displayed in the graphical user interface to the user, and the user may choose to accept or reject the proposal. A single target language proposal, or multiple language proposal or no language proposal may be displayed depending on the computation performed in the proposal engine. For example, if the target language proposals display three proposals such as proposal A with weight 60%, proposal B with weight 30% and proposal C with weight 10%, and the terminologist accepts the proposal B with weight 30%, then the weight of all the proposals is recalculated since the selected proposal B is not the proposal with maximum weight. The proposal A with weight 60% is recalculated based on the difference as 60%−30% (proposal selected by terminologist)/10% (weight of proposal C)=3%. This results in recalculated weight of proposal A with weight 57% (60%−3%), proposal B with weight 33% (30%+3%) and proposal C (10%−3%) with weight 7%. The recalculated weight is persisted along with the selected terminology in a term database for future reference. Subsequently, when a new target language proposal is performed by a different user, and if that user chooses the proposal B over proposal A, the weight of proposal B will be recalculated and increased. Therefore, in individual target language proposal computations, the weight of target language proposals is recalculated iteratively. In case the terminologist rejects all the target language proposals, the terminologist may provide a loan word as input corresponding to the input terminology. The loan word may be a word or term borrowed from a different language. In one embodiment, the target language proposals may be ranked and the target language proposals above a certain pre-defined threshold of rank may be displayed. The threshold may be provided by the user or terminologist.

Proposal engine has many advantages, and can be used in a wide variety of scenarios such as finding terminology equivalents for a new language where no terminology exists, enhance a language for a new topic area where no reference data exists, etc. The primary advantage is the integration of terminology extraction and analysis combined with the terminology proposal engine in a seamless procedure, as opposed to using separate, non-integrated programs and modules on different platforms, often with wildly-varying interfaces or even different terminology repositories. The ease-of-use of the combined embodiments result in significant savings and increased qualitative and quantitative outputs by designing and providing a single cloud-based platform utilizing a single proposal engine.

In an exemplary scenario, if a terminologist spends X minutes to conduct research on online resources, authoritative resources, etc., and perform translation for a terminology. Using the proposal engine, a target language proposal for the terminology is provided in X/3 or X/4 minutes. This results in significant reduction of research time using the proposal engine. Further, the target language proposals provided by the proposal engine simplifies the research steps that would otherwise require the user to switch between multiple programs and interfaces. When the terminologist approves a translation for a terminology, that approved terminology is stored in the term repository, and is provided in subsequent translation to other terminologists/translators/content creators, thereby saving their time. Terminology research can be a time-consuming process in both translation and authoring. With the increasing speed to market, the rising volume of material, and the growing complexity of processes, having terminology available saves time at every stage of the product cycle. Create terminology UI has the capability of accepting a scanned document, and retrieving an input terminology from the scanned document as input. The proposal engine determines the target language proposal corresponding to the scanned input terminology.

FIG. 6 is flow chart illustrating process 600 of determining target language equivalents, according to one embodiment. At 605, an input terminology is received in a source language to determine a target language proposal. For example, 502 in FIG. 5A shows the input terminology. At 610, in a proposal engine, when a configuration profile is available, the following steps are performed. At 615, a set of target language equivalents are determined by applying a user-defined set of approaches to the input terminology. For example, steps 508 to 514 in FIG. 5A shows determining the target language equivalents. At 620, statistics is computed corresponding to the set of target language equivalents. For example, FIG. 5B shows the statistics computed corresponding to the set of target language equivalents. At 625, a target language proposal from among the set of target language equivalents is determined based on the computed statistics. At 630, the target language proposal along with the computed statistics is displayed in a graphical user interface. For example, the target language proposal is displayed as shown in 542 in FIG. 5A.

Some embodiments may include the above-described methods being written as one or more software components. These components, and the functionality associated to them, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments.

One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    receive, from a user, an input terminology in a source language to determine a target language proposal;
    in a proposal engine, when a configuration profile corresponding to the user is available:
        determine a set of target language equivalents by applying a user-defined set of approaches to the input terminology, wherein the user-defined set of approaches are comprised in the configuration profile;
        compute statistics corresponding to the set of target language equivalents, wherein the statistics are computed based on a set of weights that are comprised in the configuration profile and are associated with the user-defined set of approaches, wherein the user pre-configures, in the configuration profile corresponding to the user, a corresponding weight for each one of the user-defined set of approaches;
        based on the computed statistics, determine the target language proposal from among the set of target language equivalents; and
        display the target language proposal along with at least a part of the computed statistics in a graphical user interface.

2. The non-transitory computer-readable medium of claim 1, further comprises instructions which when executed by the computer further cause the computer to:
    in a proposal engine, when the configuration profile is not available:
        determine a set of target language equivalents by applying a pre-defined set of approaches to the input terminology;
        compute statistics corresponding to the set of target language equivalents;
        based on the computed statistics, determine the target language proposal from among the set of target language equivalents; and
    display the target language proposal along with the computed statistics in a graphical user interface.

3. The non-transitory computer-readable medium of claim 1, further comprises instructions which when executed by the computer further cause the computer to:
    upon determining that a term data is available, use multilingual term data to verify the term data on a multi-channel approach; and
    upon determining that the term data is not available, use linguistic feature to determine the target language proposal.

4. The non-transitory computer-readable medium of claim 1, wherein the user-defined set of approaches to determine the target language proposal include using calque, and using a reference language as an intermediate language.

5. The non-transitory computer-readable medium of claim 1, further comprises instructions which when executed by the computer further cause the computer to:
    record a user action corresponding to the displayed target language proposal;
    recognize a pattern corresponding to the user action; and
    implicitly modify the configuration profile corresponding to the user based on the recognized pattern.

6. The non-transitory computer-readable medium of claim 1, further comprises instructions which when executed by the computer further cause the computer to:
    receive configuration parameters in a configuration user interface corresponding to the configuration profile; and
    save the configuration profile in a configuration and statistical database.

7. The non-transitory computer-readable medium of claim 6, further comprises instructions which when executed by the computer further cause the computer to:
    determine the target language proposal based on a plurality of configuration profiles, wherein a plurality of configuration parameters is defined in a configuration user interface corresponding to the configuration profiles.

8. A computer-implemented method of determining target language equivalents, the method comprising:
    receiving, from a user, an input terminology in a source language to determine a target language proposal;
    in a proposal engine, when a configuration profile corresponding to the user available:
        determining a set of target language equivalents by applying a user-defined set of approaches to the input terminology, wherein the user-defined set of approaches are comprised in the configuration profile;
        computing statistics corresponding to the set of target language equivalents, wherein the statistics are computed based on a set of weights that are comprised in the configuration profile and are associated with the user-defined set of approaches, wherein the user pre-configures, in the configuration profile corresponding to the user, a corresponding weight for each one of the user-defined set of approaches;
        based on the computed statistics, determining the target language proposal from among the set of target language equivalents; and
        displaying the target language proposal along with at least a part of the computed statistics in a graphical user interface.

9. The method of claim 8, further comprising:
in a proposal engine, when the configuration profile is not available:
determining a set of target language equivalents by applying a set of pre-defined approaches to the input terminology;
computing statistics corresponding to the set of target language equivalents;
based on the computed statistics, determining the target language proposal from the set of target language equivalents; and
displaying the target language proposal along with the computed statistics in a graphical user interface.

10. The method of claim 8, further comprising:
upon determining that a term data is available, use multilingual term data to verifying the term data on a multi-channel approach; and
upon determining that the term data is not available, using linguistic feature to determine the target language proposal.

11. The method of claim 8, wherein the user-defined set of approaches to determine the target language proposal include using calque, and using a reference language as an intermediate language.

12. The method of claim 8, further comprising:
recording a user action corresponding to the displayed target language proposal;
recognize a pattern corresponding to the user action; and
implicitly modifying the configuration profile corresponding to the user based on the recognized pattern.

13. The method of claim 8, further comprising:
receiving configuration parameters in a configuration screen corresponding to the configuration profile; and
saving the configuration profile in a configuration and statistics database.

14. The method of claim 13, further comprising:
determining the target language proposal based on a plurality of configuration profiles, wherein a plurality of configuration parameters is defined in a configuration user interface corresponding to the configuration profiles.

15. A computer system for determining target language equivalents, comprising:
a computer memory to store program code; and
a processor to execute the program code to:
receive, from a user, an input terminology in a source language to determine a target language proposal;
in a proposal engine, when a configuration profile corresponding to the user is available:
determine a set of target language equivalents by applying a user-defined set of approaches to the input terminology, wherein the user-defined set of approaches are comprised in the configuration profile;
compute statistics corresponding to the set of target language equivalents, wherein the statistics are computed based on a set of weights that are comprised in the configuration profile and are associated with the user-defined set of approaches,
wherein the user pre-configures, in the configuration profile corresponding to the user, a corresponding weight for each one of the user-defined set of approaches;
based on the computed statistics, determine the target language proposal from among the set of target language equivalents;
display the target language proposal along with at least a part of the computed statistics in a graphical user interface;
receive an acceptance or a rejection of the target language proposal; and
based on the acceptance or the rejection of the target language proposal, increase, in the configuration profile, at least a first weight of the set of weights and decrease, in the configuration profile, at least a second weight of the set of weights.

16. The system of claim 15, wherein the processor further executes the program code to:
upon determining that configuration data is not available;
in a proposal engine:
determine a set of target language equivalents by applying a pre-defined set of approaches to the input terminology;
compute statistics corresponding to the set of target language equivalents;
based on the computed statistics, determine a target language proposal from among the set of target language equivalents; and
display the target language proposal along with the computed statistics in a graphical user interface.

17. The system of claim 15, wherein the processor further executes the program code to:
upon determining that a term data is available, use multilingual term data to verify the term data on a multi-channel approach; and
upon determining that the term data is not available, use linguistic feature to determine the target language proposal.

18. The system of claim 15, wherein the user-defined set of approaches to determine the target language proposal include using calque, and using a reference language as an intermediate language.

19. The system of claim 15, wherein the processor further executes the program code to:
record a user action corresponding to the displayed target language proposal;
recognize a pattern corresponding to the user action; and
implicitly modify the configuration profile corresponding to the user based on the recognized pattern.

20. The system of claim 15, wherein the processor further executes the program code to:
receive configuration parameters in a configuration user interface corresponding to the configuration profile; and
save the configuration profile in a configuration and statistical database.

* * * * *